United States Patent
Dickey

(10) Patent No.: US 9,572,219 B1
(45) Date of Patent: Feb. 14, 2017

(54) HUE AND DIMMING CONTROL CIRCUITS FOR LAMPS OR LED ARRAYS

(71) Applicant: Hamilton Sundstrand Corporation, Charlotte, NC (US)

(72) Inventor: John A. Dickey, Caledonia, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 14/853,633

(22) Filed: Sep. 14, 2015

(51) Int. Cl.
  *H05B 41/28* (2006.01)
  *H05B 41/39* (2006.01)
  *H05B 33/08* (2006.01)
  *B64D 11/00* (2006.01)

(52) U.S. Cl.
  CPC .......... *H05B 33/0851* (2013.01); *B64D 11/00* (2013.01); *H05B 33/0866* (2013.01); *B64D 2011/0053* (2013.01)

(58) Field of Classification Search
  None
  See application file for complete search history.

(56) References Cited

U.S. PATENT DOCUMENTS

| | | | |
|---|---|---|---|
| 7,333,011 B2 | 2/2008 | Singer et al. | |
| 7,675,248 B2 | 3/2010 | Mubaslat et al. | |
| 8,100,552 B2 | 1/2012 | Spero | |
| 9,030,103 B2 | 5/2015 | Pickard | |
| 2012/0153855 A1* | 6/2012 | Sun | H05B 33/0815 315/200 R |
| 2012/0286667 A1* | 11/2012 | Wang | H05B 33/0887 315/119 |
| 2014/0203729 A1 | 7/2014 | Van De Ven | |
| 2015/0048678 A1* | 2/2015 | Gong | H05B 33/0851 307/24 |

FOREIGN PATENT DOCUMENTS

| | | |
|---|---|---|
| GB | 2498836 A | 7/2013 |
| GB | 2516696 A | 2/2015 |

* cited by examiner

*Primary Examiner* — Douglas W Owens
*Assistant Examiner* — Dedei K Hammond
(74) *Attorney, Agent, or Firm* — Kinney & Lange, P.A.

(57) ABSTRACT

A lighting system includes a light-emitting diode (LED) that emits light having a hue that varies in response to variations in a voltage applied to the LED and an intensity that varies in response to variations in a duty cycle of the applied voltage. The lighting system includes a controller configured to receive a command signal having a periodic peak voltage and a periodic valley voltage. The controller includes a peak detector and a valley detector that detects the peak voltage and the valley voltage, respectively. The controller includes a pulse generator that generates a pulse stream having a pulse-voltage magnitude substantially equal to the detected peak voltage and a pulse-voltage duty cycle substantially equal to the ratio of the detected valley voltage to the detected peak voltage. The generated pulse stream is applied to the LED resulting in light emission of the controlled hue and of the controlled intensity.

20 Claims, 5 Drawing Sheets

HUE AND DIMMING CONTROL CIRCUITS FOR LAMPS OR LED ARRAYS

BACKGROUND

Aircraft lighting systems are used to provide lighting for various purposes. Some systems provide illumination of instrumentation. Some systems illuminate cabin spaces. Some systems are for external lighting. Some systems provide overhead illumination of passenger seating areas to facilitate reading. Light Emitting Diode (LED) arrays are used to provide illumination for some of these lighting systems. LED arrays can require large power controllers to control the hue and brightness. Such power controllers can be located near each individual lighting source, resulting in a large number of such controllers. Having controllers distributed throughout an aircraft can contribute weight to the aircraft and add expense to the cost of the aircraft.

The intensity of light emission from LED lighting arrays changes in response to an applied power to the LED lighting array. As the applied power is increased, the intensity of light emission usually increases. Some LED lighting arrays emit a light whose color is also a function of the power consumed by the LED lighting array. For example, the color of the emitted light can change in response to a change in the applied voltage to the LED lighting array. People expect that some lighting systems will have a specific color. For example, when reading, people expect overhead illumination to be within a predetermined range of colors called "white light."

Because both intensity and hue are functions of the voltage and current applied to an LED lighting array, control of both intensity and hue are performed using pulsed methods. The voltage and current levels are determined by a color specification. Then a duty cycle is determined by an intensity specification. The frequency rate at which these pulses are applied to an LED lighting array is bounded by two different concerns or hazards. If the pulse rate is too low, a human will perceive the LED lighting array to be undesirably flickering. If the pulse rate is too high, conducted and/or radiated emissions may cause undesirable coupling to sensitive airplane instrumentation.

SUMMARY

Apparatus and associated methods relate to a lighting system for emitting light of a controlled hue and of a controlled intensity. The lighting system includes a light-emitting diode (LED) that emits light having a hue that varies in response to variations in a voltage applied to the LED. The emitted light has an intensity that varies in response to variations in a duty cycle of the voltage applied to the LED. The lighting system includes a controller configured to receive a command signal having both AC and DC components that result in the command signal having a periodic peak voltage and a periodic valley voltage. The peak voltage is indicative of the controlled hue. A ratio of the valley voltage to the peak voltage is indicative of the controlled intensity. The controller includes a peak detector that detects the peak voltage. The controller includes a valley detector that detects the valley voltage. The controller also includes a pulse generator that generates a pulse stream having a pulse-voltage magnitude substantially equal to the detected peak voltage and a pulse-voltage duty cycle substantially equal to the ratio of the detected valley voltage to the detected peak voltage. The generated pulse stream is applied to the LED resulting in light emission of the controlled hue and of the controlled intensity.

Various embodiments relate to a method of controlling both a hue and an intensity of an LED. The method includes creating, in a lighting power control system, a command signal having both AC and DC components that give the lighting signal a peak voltage and a valley voltage. The peak voltage is indicative of the predetermined color value. A ratio of the valley voltage to the peak voltage is indicative of the predetermined intensity value. The method includes sending the command signal from the lighting power controller to a lighting element controller. The method includes detecting, in the lighting element controller, the peak voltage of the command signal. The method includes detecting, in the lighting element controller, the valley voltage of the command signal. The method includes generating, in the lighting element controller, a pulse stream that has a pulse-voltage magnitude substantially equal to the detected peak voltage and a pulse-voltage duty cycle substantially equal to the ratio of the detected valley voltage to the detected peak voltage. The method also includes providing the generated pulse stream to a Light Emitting Diode (LED).

Some embodiments relate to a lighting power control system for generating a lighting control signal. The lighting power control system includes a DC power supply that generates a supply signal. The lighting power control system includes a chopper that chops the supply signal. The lighting power control system includes a filter that filters the chopped supply signal. The lighting power control system also includes a processor that controls the DC power supply and the chopper. The DC power supply is controlled such that the filtered chopped supply signal has a peak that corresponds to a hue of a Light Emitting Diode (LED). The chopper is controlled such that the filtered chopped supply signal has a ratio of a valley of the filtered chopped supply signal to the peak of the filtered chopped supply signal. The ratio corresponds to a duty cycle that, when applied to the LED, will result in emission of light corresponding to a predetermined intensity value.

DETAILED DESCRIPTION

This specification discloses an exemplary method of providing hue and intensity control locally with respect to a lighting element in response to a control signal generated remotely at a lighting power controller.

Figure 1:
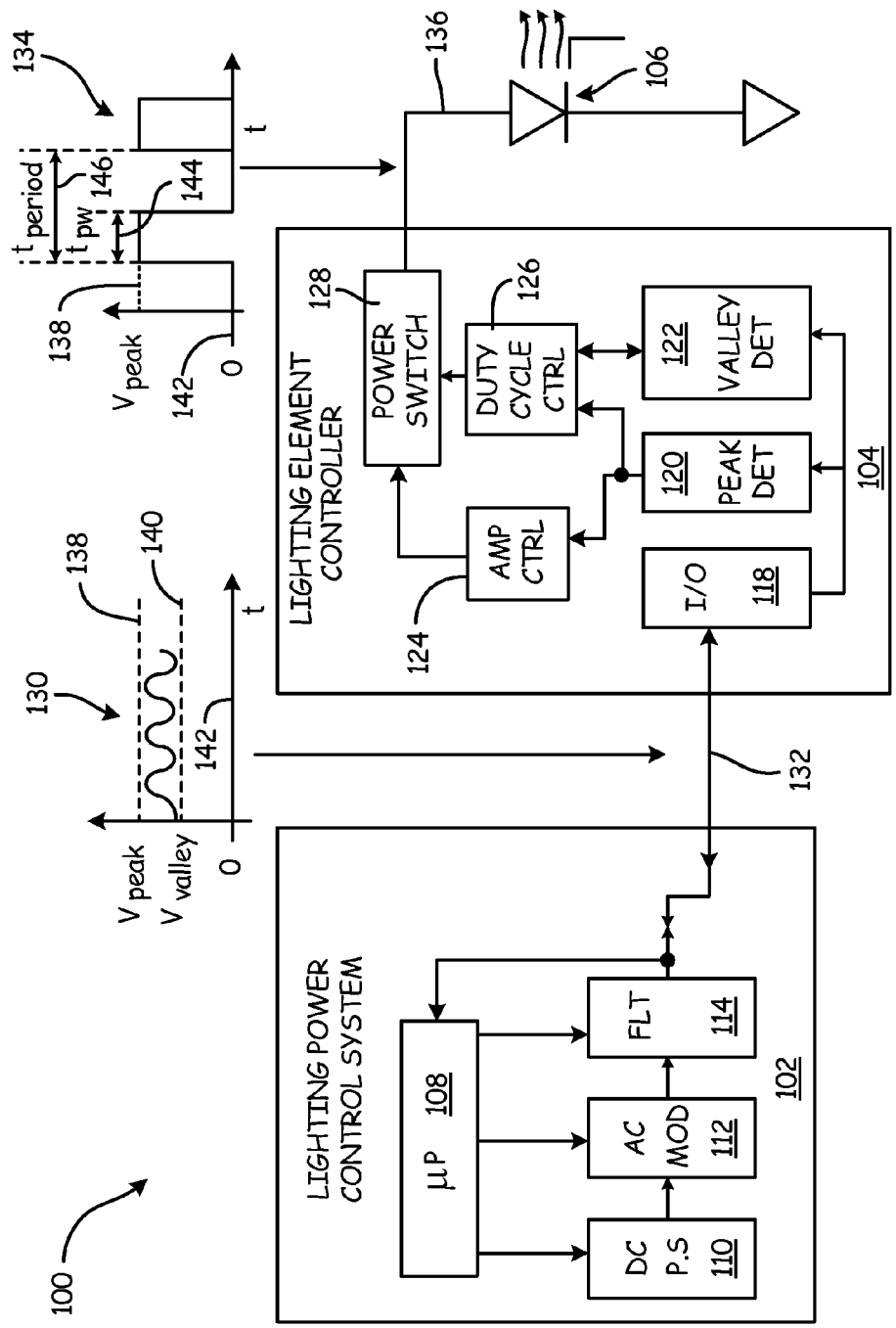
FIG. 1 is a block diagram of an exemplary system for controlling hue and dimming of Light Emitting Diodes (LEDs).

FIG. 1 is a block diagram of an exemplary system for controlling hue and dimming of Light Emitting Diodes (LEDs). In FIG. 1, exemplary lighting control system 100 includes lighting power control system 102, lighting element controller 104, and LED 106. Lighting power control system 102 includes microprocessor 108, DC power supply 110, AC modulator 112, and Filter 114. Lighting element controller 104 includes Input/Output buffer 118, peak detector 120, valley detector 122, amplitude controller 124, duty cycle controller 126 and power switch 128. Lighting power control system 102 sends command signal 130 to lighting element controller 104 via circuit net 132. Lighting element controller 104 sends excitation signal 134 to LED 106 via circuit net 136.

LED 106 can represent a single LED or an array of LEDS all excited by excitation signal 134 carried on circuit net 136 or by a copy of excitation signal 134 carried on one or more other circuit nets. Lighting element controller 104 receives control signal 130 and converts control signal 130 to excitation signal 134 which will be used to affect a hue and an intensity of light from LED 106. The hue and intensity commands are encoded in the control signal 130 using voltage peak, $V_{peak}$ 138, and voltage valley, $V_{valley}$ 140, of control signal 130. $V_{peak}$ 138 and $V_{valley}$ 140 are maximum and minimum voltages, respectively, of command signal 130, which has a DC level and an AC modulation. $V_{peak}$ 138, which is measured with respect to ground reference voltage 142, specifies a peak voltage amplitude of excitation signal 134. A ratio of $V_{valley}$ 140 to $V_{peak}$ 138 specifies the duty cycle of the excitation signal 134. The duty cycle of excitation signal 134 can be expressed as the pulse width, $t_{pw}$ 144, divided by the period, $t_{period}$ 146.

Lighting power control system 102 creates control signal 130 by way of microprocessor operations in the exemplary embodiment depicted. Microprocessor 108 may receive inputs from a user interface (not depicted), for example, that include desired hue and intensity information of LED 106. In one example, microprocessor 108 provides DC power supply 110 with command signals that causes DC power supply 110 to create a DC signal having the commanded DC level. DC power supply 110 then provides AC modulator 112 the commanded DC signal. In some embodiments, microprocessor 108 provides AC modulator 112 with a command signal that causes AC modulator 112 to modulate the received DC signal with the commanded AC modulation. AC modulator 112 then provides the AC modulated signal to filter 114.

In an exemplary embodiment, microprocessor 108 provides filter 114 with a command signal that causes filter 114 to apply a commanded filtering operation to the received AC modulated signal. In some embodiments, filter 114 may be static and may receive no command signal from microprocessor 108. Filter 114 provides command signal 130 to circuit net 132 as an output of lighting power control system 102. Filter 114 also provides command signal 130 to microprocessor 108.

Lighting element controller 104 transforms command signal 130 into excitation signal 134. Input/Output block 118 of Lighting element controller 104 receives command signal 130 from circuit net 132. Input/Output block 118 might provide electro-magnetic interference filtering of command signal 130. Input/Output block 118 provides the received command signal to both peak detector 120 and valley detector 122. Peak detector 120 detects a maximum voltage of the received signal, and provides a signal containing information representing the detected maximum voltage both to amplitude controller 124 and to duty cycle controller 126. Valley detector 122 detects a minimum voltage of the received signal, and provides a signal containing information representing the detected minimum voltage to duty cycle controller 126. Amplitude controller 124 and duty cycle controller 126 provide signals used by power switch 128 for generating excitation signal 134. In some embodiments, amplitude controller 124 may simply transmit $V_{peak}$ 138 to power switch 128. Power switch 128 generates excitation signal 134 having $V_{peak}$ 138 and a duty cycle substantially equal to a ratio of pulse width 144 to period 146.

Lighting system 100 may be used to control lighting elements in an aircraft. An aircraft may have many LEDs 106 located in various locations about an aircraft. LEDs 106 may be grouped into a number of independently controllable groups. Each independently controllable group might have a dedicated lighting element controller 104 which provides excitation signal 134 to its associated group of LEDs 106. Each independent lighting element 104 controller may be located proximate the group of LEDs 106 of which it controls. By performing the conversion of user inputs into command signals 130 at a remote location, independent lighting elements 104 need not perform such functions. Dividing functionality in such a way can reduce the cost, weight, and/or complexity of independent lighting element controllers 104.

Lighting power control system 102 may be located at a convenient location of an aircraft. Each lighting element controller 104 may receive an independent command signal 130 from lighting power control system 102. Each command signal contains both an intensity command and a hue command that can be carried on a single pair of wires or with one power wire and using the aircraft grounding system as the return in place of a second wire. Such a configuration can advantageously reduce the cost and/or weight of a wiring harness.

Figure 2:
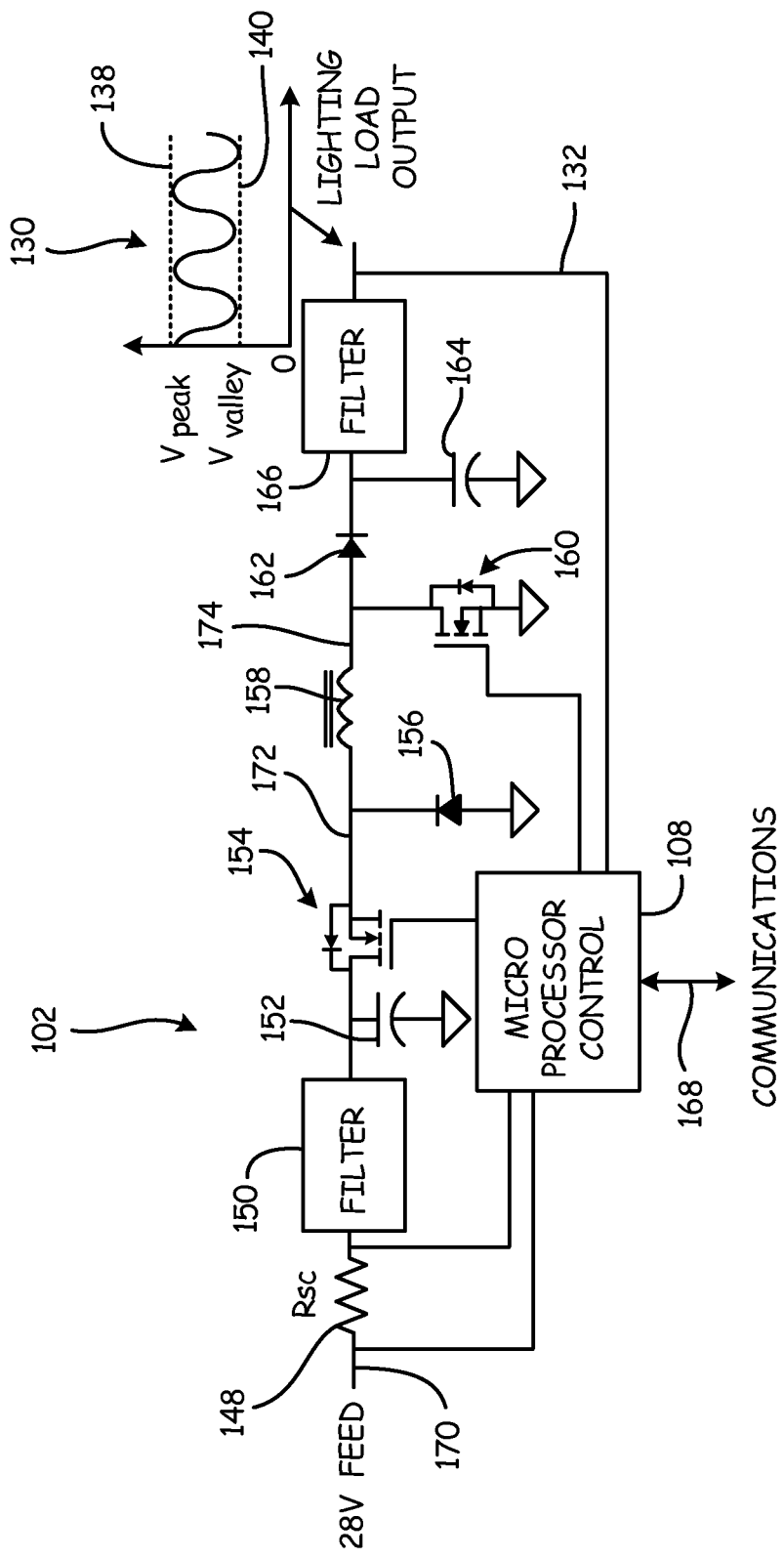
FIG. 2 is schematic diagram of an exemplary lighting power control system.

FIG. 2 is schematic diagram of an exemplary lighting power control system. In FIG. 2, exemplary lighting power control system 102 includes microprocessor 108, power monitoring resistor 148, input filter 150, capacitor 152, step-down transistor 154, diode 156, inductor 158, step-up transistor 160, diode 162, capacitor 164, and output filter 166. Microprocessor 108 communicates with systems, such as, for example, a user interface or a control system, via communications signals carried on circuit net 168. Microprocessor 108 monitors input current from a power supply such as a 28 volt power feed on circuit net 170, by monitoring a voltage drop across power monitoring resistor 148. Filter 150 removes undesirable noise from the 28 volt power feed and prevents locally generated noise from escaping onto the 28V feed. Capacitor 152 provides a source of charge storage for lighting power control system 102.

Lighting power control system 102 can operate as a buck converter by switching step-down transistor 154. Lighting power control system 102 can also operate as a boost converter by switching step-up transistor 160. Some embodiments may include only capability to operate as either a buck converter or a boost converter. In such embodiments, either step-up transistor 160 used for boost conversion or step-down transistor 154 used for buck conversion may be eliminated.

Step-down transistor 154 is controlled by microprocessor 108 to provide a pulse-width modulated conductance of charge from capacitor 152 to circuit net 172. Inductor 158 conducts the charge from circuit net 172 to circuit net 174. Diode 156 prevents circuit net 172 from having a significant negative voltage when step-down transistor 154 is turned off, as current cannot instantaneously turn off in inductor 158. Step-up transistor 160 modulates the signal carried on circuit net 174. In normal operation step-down transistor 154 and step-up transistor 160 are not operated simultaneously. Transistor 168 is controlled by microprocessor 108. Diode 162 provides conduction of the modulated signal from circuit net 174 to filter 166. Capacitor 164 and filter 166 condition the modulated signal, and filter 166 provides command signal 130 to circuit net 132. In some embodiments, microprocessor 108 monitors command signal 130 and performs closed loop feedback operations to ensure that command signal 130 has predetermined $V_{peak}$ 138 and predetermined $V_{valley}$ 140. A second current monitoring function can be added between output filter 166 and circuit net 132 to facilitate closed-loop control of current.

Figure 3:
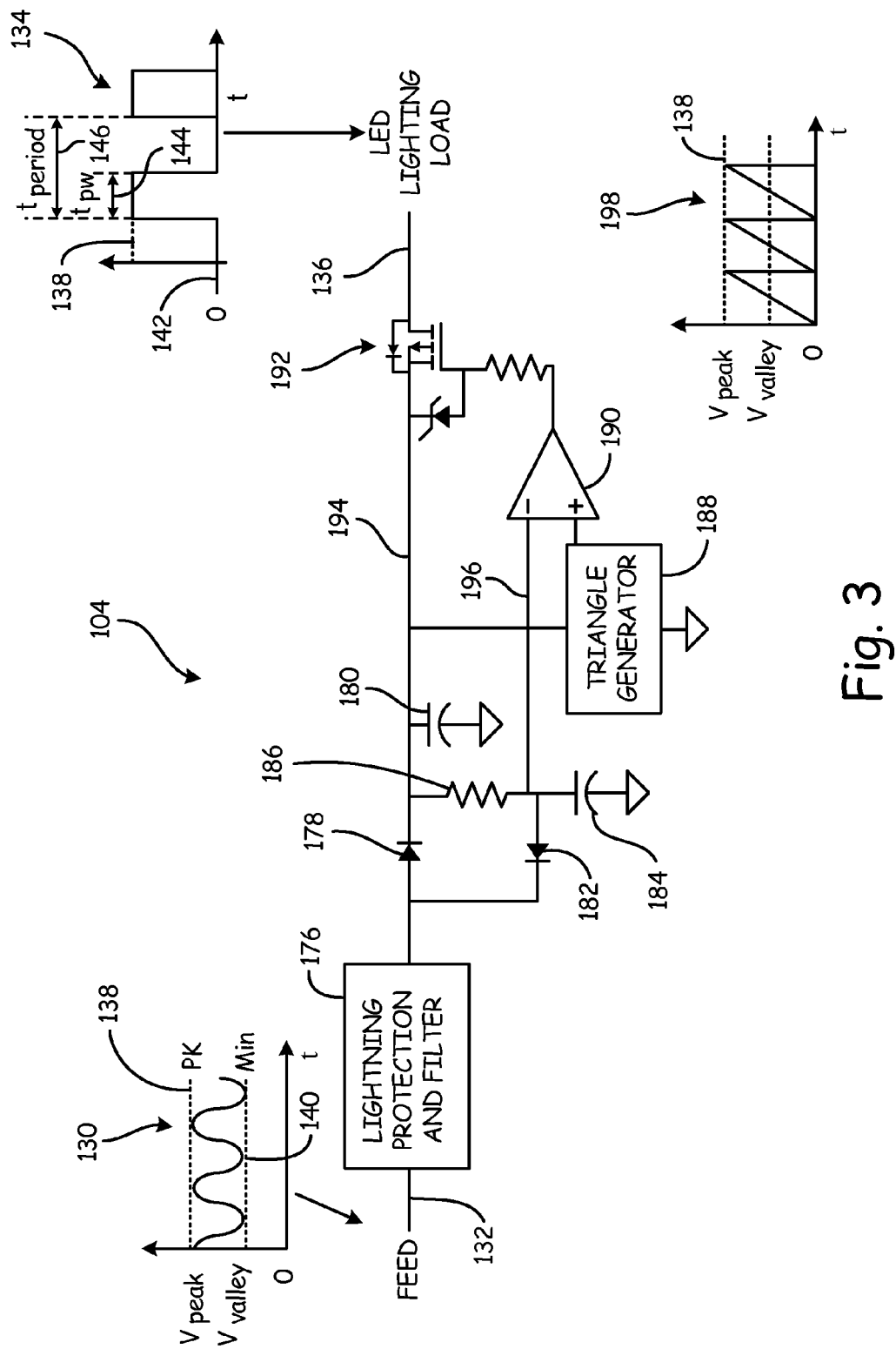
FIG. 3 is a schematic diagram of an exemplary lighting element controller.

FIG. 3 is a schematic diagram of an exemplary lighting element controller. In FIG. 3, exemplary lighting element controller 104 includes lightning protection filter 176, peak detector 120 including diode 178 and capacitor 180, valley detector 122, which includes diode 182 and capacitor 184, resistor 186, triangle generator 188, comparator 190 and transistor 192. Command signal 130 is received by lighting element controller 104 via input circuit net 132. In some embodiments, lightning protection filter 176 provides filtering and/or signal protection or both for received command signal 130. For example, snubbers might provide circuit protection of lighting element controller 104. A low-pass filter can remove unwanted high-frequency noise that could have coupled to circuit net 132 and/or can block locally generated noise by transistor 192 from coupling to circuit net 132.

Resistor 186 provides a leakage path between $V_{peak}$ 138 on circuit net 194 and $V_{valley}$ 140 on circuit net 196. Triangle generator 188 provides sawtooth triangle signal 198 between a reference voltage and $V_{peak}$ 138 carried on circuit net 194. If sawtooth triangle signal 198 is less than $V_{valley}$ 140, then comparator 190 will drive transistor 192 to an on state in which transistor 192 provides $V_{peak}$ 138 on circuit net 194 to output circuit net 136. If sawtooth triangle signal 198 is greater than $V_{valley}$ 140, then comparator 190 will turn off drive transistor 192. When drive transistor 192 is turned off, LED 106, which is connected to circuit net 136, will pull circuit net 136 to the reference voltage (typically a "ground" potential). In this way, a ratio of $V_{valley}$ 140 to $V_{peak}$ 138 specifies the duty cycle of a high-voltage portion of the excitation signal 134. In some embodiments, the polarity of the comparator can be inverted. In such embodiments, a ratio of $V_{valley}$ 140 to $V_{peak}$ 138 specifies the duty cycle of a low-voltage portion of excitation signal 134.

Figure 4:
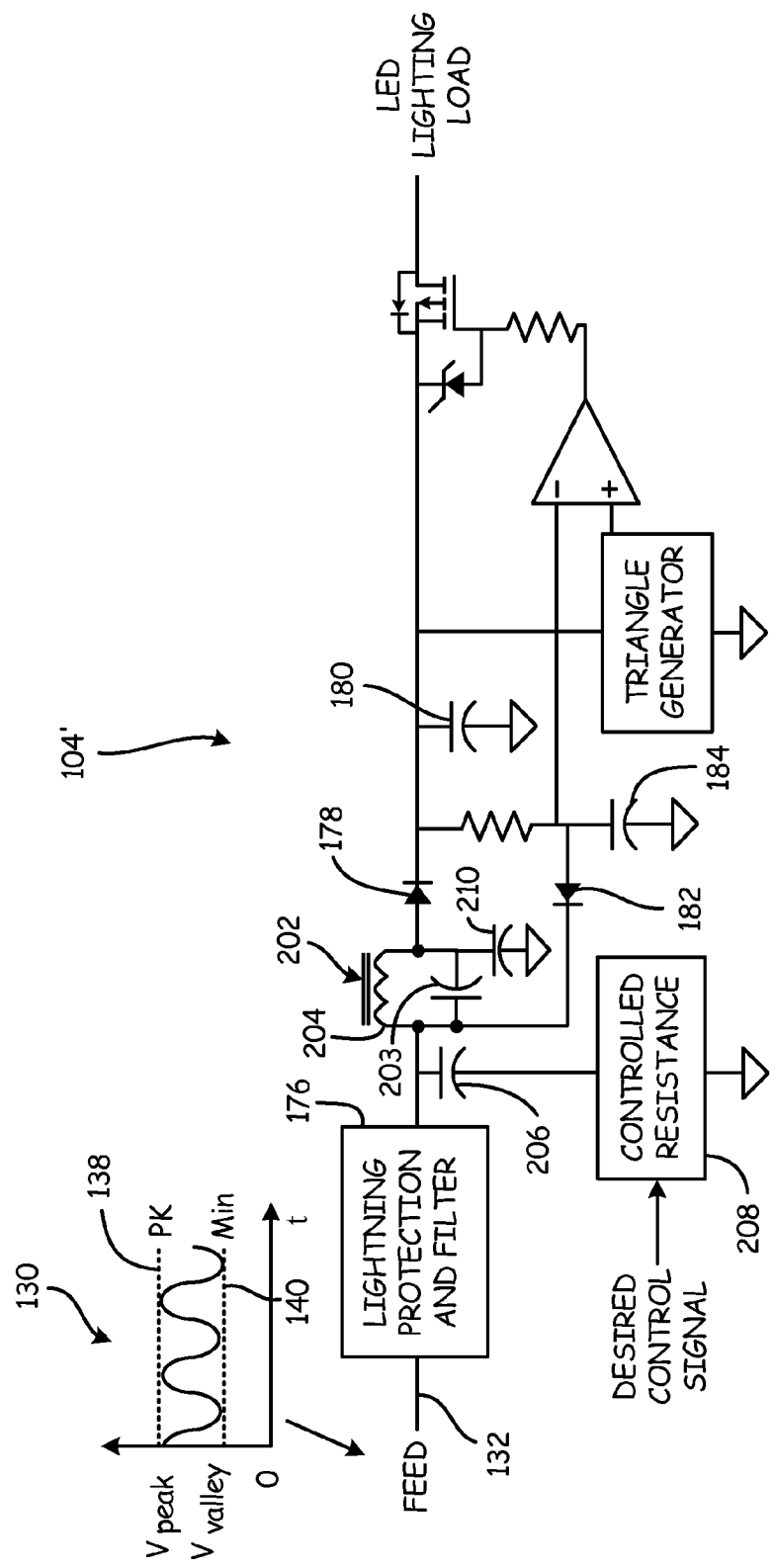
FIG. 4 is a schematic diagram of an exemplary lighting element controller with dual way communication capability.

FIG. 4 is a schematic diagram of an exemplary lighting element controller with dual direction or 'full duplex' communication capability. In FIG. 4, exemplary lighting element controller can communicate information to lighting power control system 102 via circuit net 132. FIG. 4's exemplary lighting element controller 104' includes every circuit element of exemplary lighting element 104 depicted in FIG. 3, plus some additional circuit components. Between lightning protection filter 176 and peak and valley detectors 178, 180, 182, 184 are a resonant tank circuit 202, capacitor 206, and controlled resistance 208. Resonant tank circuit includes capacitor 203 and inductor 204. Controlled resistance 208 can cause lighting element controller 104' to deliver more AC current through circuit net 132. Lighting power control system 102 can then monitor the AC current content being provided and interpret the provided current into signal information.

In some embodiments, controlled resistance 208 is essentially a DC signal or only a signal that changes very slowly (e.g., a low-frequency signal). Controlled resistance 208 may provide a controlled load to the modulation that is present on signal 130 while resonant tank circuit 202 blocks the modulation. Controlled resistance 208 is coupled to line 132 through capacitor 206 and lightning protection filter 176. The value of controlled resistance 208 may permit a current proportional to the modulation voltage and inversely proportional to the resistance to flow which can then be detected by microprocessor 108, which interprets the detected current as information that represents the value the controlled resistance.

In some embodiments, controlled resistance 208 can be modulated at frequencies are substantially blocked by resonant tank circuit 202. Resonant tank circuit 202 can provide good transmission of the average value of command signal 130 while simultaneously rejecting frequencies associated with modulating controlled resistance 208.

In various embodiments, various frequencies can be used to supply the AC modulation of a command signal. For example, in some embodiments, a fundamental frequency of modulation might be between 100 Hz and 5 kHz. In an exemplary embodiment, the fundamental frequency of modulation might be between 1 kHz and 3 kHz, for example. In some embodiments, the command signal provides operating power for the lighting element controller. In an exemplary embodiment the command signal provides operating power for the LED controlled by the lighting element controller to which the command signal is provided.

Figure 5:
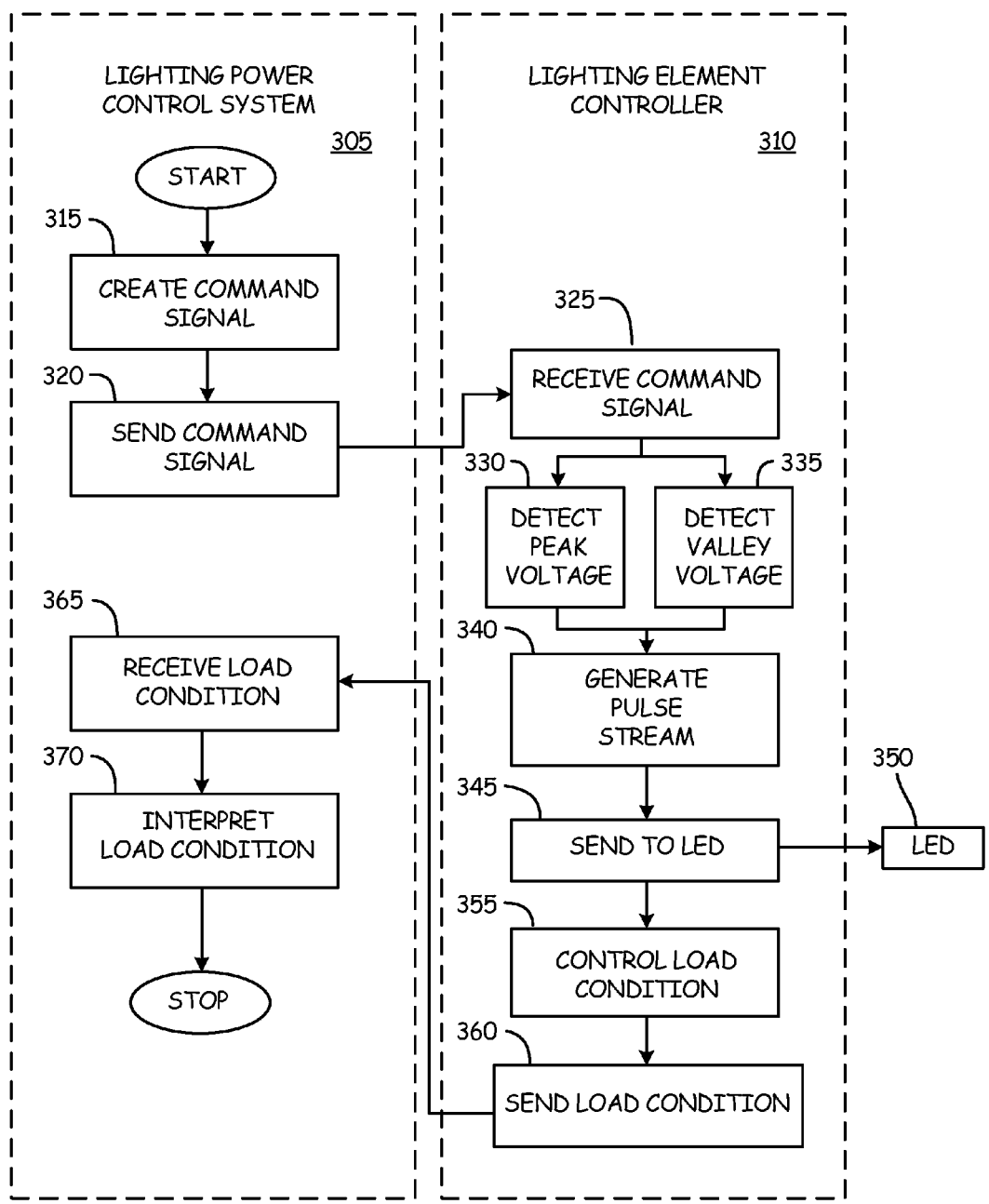
FIG. 5 is a flow chart of an exemplary method of controlling both a hue and an intensity of a LED.

FIG. 5 is a flow chart of an exemplary method of controlling both a hue and an intensity of a LED. In FIG. 5 exemplary method 300 is executed in part by lighting power control system 305 and in part by lighting element controller 310. Method 300 begins with lighting power control system 305 creating a command signal at step 315. Then, at step 320, lighting power control system 305 sends the created command signal to lighting element controller 310. At step 325, lighting element controller 310 receives the command signal. Then at step 330, lighting element controller 310 detects a peak voltage of the received command signal. At step 335, lighting element controller 310 detects a valley voltage of the received command signal. Then at step 340, lighting element controller 310 generates a pulse stream based on the detected peak voltage and the detected valley voltage. At step 345, lighting element controller 310 sends the generated pulse stream to LED 350. At step 355, lighting element controller 310 generates a load condition. At step 360, lighting element controller 310 sends the generated load condition to lighting power control system 305. Then at step 365, lighting power control system 305 receives the load condition. At step 370, lighting power control system 305 interprets the load condition. For example, a load condition within predetermined limits may be indicative of a failure (e.g., a LED that doesn't illuminate).

A lighting system for emitting light of a controlled hue and of a controlled intensity according to an exemplary embodiment of this disclosure, among other possible things includes a light-emitting diode (LED) that emits light having a hue that varies in response to variations in a voltage applied to the LED, the emitted light having an intensity that varies in response to variations in a duty-cycle of the voltage applied to the LED. The lighting system also includes a controller configured to receive a command signal having both AC and DC components that result in the command signal having a periodic peak voltage and a periodic valley voltage, the peak voltage being indicative of the controlled hue, and a ratio of the valley voltage to the peak voltage indicative of the controlled intensity. The controller includes a peak detector that detects the peak voltage and a valley detector that detects the valley voltage. The controller also includes a pulse generator that generates a pulse stream having a pulse-voltage magnitude substantially equal to the detected peak voltage and a pulse-voltage duty cycle substantially equal to the ratio of the detected valley voltage to the detected peak voltage. The generated pulse stream is applied to the LED resulting in light emission of the controlled hue and of the controlled intensity.

A further embodiment of the foregoing lighting system, wherein the pulse generator can include a triangle wave generator, the triangle wave generator can generate a sawtooth triangle wave between a reference voltage and the peak voltage.

A further embodiment of any of the foregoing lighting systems, wherein the pulse generator can include a comparator, the comparator can be configured to generate a signal that is in a first state when the sawtooth triangle wave is greater than the valley voltage and is in a second state when the sawtooth triangle wave is less than the valley voltage.

A further embodiment of any of the foregoing lighting system, wherein the AC component of the command signal can include a first frequency range, wherein the controller further can include a status reporting module, and wherein the status reporting module can modulate the command signal in a second frequency range, the second frequency range non-overlapping the first frequency range.

A further embodiment of any of the foregoing lighting system, wherein the AC component of the command signal can have a fundamental frequency between 100 Hz and 5 kHz.

A further embodiment of any of the foregoing lighting system, wherein the AC component of the command signal can have a fundamental frequency between 1 kHz and 3 kHz.

A further embodiment of any of the foregoing lighting system, wherein operating power for the controller and for the LED are supplied by the command signal.

Any of the foregoing lighting systems can optionally include, additionally and/or alternatively, any one or more of the following features, configurations and/or additional components: i) a switch that connects the LED to the peak voltage when the generated signal is in the first state, and disconnects the LED from the peak voltage when the generated signal is in the second state; and/or ii) a lighting power controller for generating a plurality of lighting control signals. The lighting power controller can include any one or more of the following features, configurations and/or additional components: a) a DC power supply that generates a supply signal; b) a chopper that chops the supply signal; c) a filter that filters the chopped supply signal; and/or d) a processor that controls the DC power supply and the chopper, the DC power supply being controlled such that the filtered chopped supply signal has a peak that corresponds to the hue of the LED, the chopper being controlled such that the filtered chopped supply signal has a ratio of a valley of the filtered chopped supply signal to the peak of the filtered chopped supply signal, the ratio corresponding to a duty cycle that, when applied to the LED, will result in emission of light corresponding to a predetermined intensity value.

A method of controlling both a hue and an intensity of a Light Emitting Diode (LED) according to an exemplary embodiment of this disclosure, among other possible things includes creating, in a lighting power control system, a command signal having both AC and DC components that give the command signal a peak voltage and a valley voltage, the peak voltage being indicative of the predetermined color value, a ratio of the valley voltage to the peak voltage being indicative of the predetermined intensity value. The method includes sending the command signal from the lighting power control system to a lighting element controller. The method includes detecting, in the lighting element controller, the peak voltage of the command signal. The method includes detecting, in the lighting element controller, the valley voltage of the command signal. The method includes generating, in the lighting element controller, a pulse stream that has a pulse-voltage magnitude substantially equal to the detected peak voltage and a pulse-voltage duty cycle substantially equal to the ratio of the detected valley voltage to the detected peak voltage. The method includes providing the generated pulse stream to the LED.

A further embodiment of the foregoing method, wherein generating the pulse stream can include generating a sawtooth triangle wave between a reference voltage and the peak voltage.

A further embodiment of any of the foregoing methods, wherein generating the pulse stream can include comparing the sawtooth triangle wave to the detected valley voltage, and wherein if the sawtooth triangle wave is greater than the detected valley voltage a first voltage is provided to the LED, and when the sawtooth triangle wave is less than the valley voltage a second voltage is provided to the LED.

A further embodiment of any of the foregoing methods, wherein the AC component of the command signal can have a fundamental frequency between 100 Hz and 5 kHz.

A further embodiment of any of the foregoing methods, wherein the AC component of the command signal can have a fundamental frequency between 1 kHz and 3 kHz.

A lighting power control system for generating a lighting control signal according to an exemplary embodiment of this disclosure, among other possible things includes a DC power supply that generates a supply signal, a chopper that chops the supply signal, a filter that filters the chopped supply signal, and a processor that controls the DC power supply and the chopper. The DC power supply is controlled such that the filtered chopped supply signal has a peak voltage that corresponds to a hue of a Light Emitting Diode (LED). The chopper is controlled such that the filtered chopped supply signal has a ratio of a valley voltage of the filtered chopped supply signal to the peak voltage of the filtered chopped supply signal, the ratio corresponding to a duty cycle that, when applied to the LED, will result in emission of light corresponding to a predetermined intensity value.

A further embodiment of the foregoing lighting power control system, wherein the processor can monitor the filtered chopped supply signal so as to ensure that the peak voltage is substantially equal to a predetermined peak threshold.

A further embodiment of any of the foregoing lighting power control systems, wherein the processor can monitor the filtered chopped supply signal so as to ensure that the valley voltage is substantially equal to a predetermined valley threshold.

A further embodiment of any of the foregoing lighting power control systems, wherein filtered chopped supply signal can have a fundamental frequency between 100 Hz and 5 kHz.

Any of the foregoing lighting power control systems can optionally include, additionally and/or alternatively, a load sensor that can sense the current drawn by a load to which the lighting power control system provides the filtered chopped supply signal, the sensed current being indicative of information communicated by the load to the lighting power control system.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lighting system for emitting light of a controlled hue and of a controlled intensity, the lighting system comprising:
   a light-emitting diode (LED) that emits light having a hue that varies in response to variations in a voltage applied to the LED, the emitted light having an intensity that varies in response to variations in a duty-cycle of the voltage applied to the LED; and
   a controller configured to receive a command signal having both AC and DC components that result in the command signal having a periodic peak voltage and a periodic valley voltage, the peak voltage being indicative of the controlled hue, and a ratio of the valley voltage to the peak voltage indicative of the controlled intensity, the controller comprising:
   a peak detector that detects the peak voltage;
   a valley detector that detects the valley voltage; and
   a pulse generator that generates a pulse stream having a pulse-voltage magnitude substantially equal to the detected peak voltage and a pulse-voltage duty cycle substantially equal to the ratio of the detected valley voltage to the detected peak voltage,
   wherein the generated pulse stream is applied to the LED resulting in light emission of the controlled hue and of the controlled intensity.

2. The lighting system of claim 1, wherein the pulse generator comprises a triangle wave generator, the triangle wave generator generating a sawtooth triangle wave between a reference voltage and the peak voltage.

3. The lighting system of claim 2, wherein the pulse generator comprises a comparator, the comparator configured to generate a signal that is in a first state when the sawtooth triangle wave is greater than the valley voltage and is in a second state when the sawtooth triangle wave is less than the valley voltage.

4. The lighting system of claim 3, further comprising a switch, wherein the switch connects the LED to the peak voltage when the generated signal is in the first state, and disconnects the LED from the peak voltage when the generated signal is in the second state.

5. The lighting system of claim 1, wherein the AC component of the command signal comprise a first frequency range, wherein the controller further comprises a status reporting module, and wherein the status reporting module modulates the command signal in a second frequency range, the second frequency range non-overlapping the first frequency range.

6. The lighting system of claim 1, wherein the AC component of the command signal has a fundamental frequency between 100 Hz and 5 kHz.

7. The lighting system of claim 1, wherein the AC component of the command signal has a fundamental frequency between 1 kHz and 3 kHz.

8. The lighting system of claim 1, further comprising a lighting power controller for generating a plurality of lighting control signals, the lighting power controller comprising:
   a DC power supply that generates a supply signal;
   a chopper that chops the supply signal;
   a filter that filters the chopped supply signal; and
   a processor that controls the DC power supply and the chopper, the DC power supply being controlled such that the filtered chopped supply signal has a peak that corresponds to the hue of the LED, the chopper being controlled such that the filtered chopped supply signal has a ratio of a valley of the filtered chopped supply signal to the peak of the filtered chopped supply signal, the ratio corresponding to a duty cycle that, when applied to the LED, will result in emission of light corresponding to a predetermined intensity value.

9. The lighting system of claim 1, wherein operating power for the controller and for the LED are supplied by the command signal.

10. A method of controlling both a hue and an intensity of a Light Emitting Diode (LED), the method comprising:
    creating, in a lighting power control system, a command signal having both AC and DC components that give the command signal a peak voltage and a valley voltage, the peak voltage being indicative of the predetermined color value, a ratio of the valley voltage to the peak voltage being indicative of the predetermined intensity value;
    sending the command signal from the lighting power control system to a lighting element controller;
    detecting, in the lighting element controller, the peak voltage of the command signal;
    detecting, in the lighting element controller, the valley voltage of the command signal;
    generating, in the lighting element controller, a pulse stream that has a pulse-voltage magnitude substantially equal to the detected peak voltage and a pulse-voltage duty cycle substantially equal to the ratio of the detected valley voltage to the detected peak voltage; and
    providing the generated pulse stream to the LED.

11. The method of claim 10, wherein generating the pulse stream comprises generating a sawtooth triangle wave between a reference voltage and the peak voltage.

12. The method of claim 11, wherein generating the pulse stream comprises comparing the sawtooth triangle wave to the detected valley voltage, and wherein if the sawtooth triangle wave is greater than the detected valley voltage a first voltage is provided to the LED, and when the sawtooth triangle wave is less than the valley voltage a second voltage is provided to the LED.

13. The lighting system of claim 10, further comprising detecting, in the lighting power control system, a load condition of the lighting element controller, the load condition indicative of information communicated from the lighting element controller to the lighting power control system.

14. The method of claim 10, wherein the AC component of the command signal has a fundamental frequency between 100 Hz and 5 kHz.

15. The method of claim 10, wherein the AC component of the command signal has a fundamental frequency between 1 kHz and 3 kHz.

16. A lighting power control system for generating a lighting control signal, the lighting power control system comprising:
    a DC power supply that generates a supply signal;
    a chopper that chops the supply signal;
    a filter that filters the chopped supply signal; and
    a processor that controls the DC power supply and the chopper, the DC power supply being controlled such that the filtered chopped supply signal has a peak voltage that corresponds to a hue of a Light Emitting Diode (LED), the chopper being controlled such that the filtered chopped supply signal has a ratio of a valley voltage of the filtered chopped supply signal to the peak voltage of the filtered chopped supply signal, the ratio corresponding to a duty cycle that, when applied to the LED, will result in emission of light corresponding to a predetermined intensity value.

17. The lighting power control system of claim 16, wherein the processor monitors the filtered chopped supply signal so as to ensure that the peak voltage is substantially equal to a predetermined peak threshold.

18. The lighting power control system of claim 16, wherein the processor monitors the filtered chopped supply signal so as to ensure that the valley voltage is substantially equal to a predetermined valley threshold.

19. The lighting power control system of claim 16, wherein filtered chopped supply signal has a fundamental frequency between 100 Hz and 5 kHz.

20. The lighting power control system of claim 16, further comprising a load sensor that senses the current drawn by a load to which the lighting power control system provides the filtered chopped supply signal, the sensed current being indicative of information communicated by the load to the lighting power control system.

* * * * *